United States Patent [19]

Ishibashi et al.

[11] Patent Number: 5,663,942
[45] Date of Patent: Sep. 2, 1997

[54] JITTER MEASUREMENT APPARATUS DETECTING AMPLITUDE OF PHASE ERRORS BETWEEN INFORMATION SIGNAL AND SYNCHRONIZED CLOCK SIGNAL

[75] Inventors: Hiromichi Ishibashi, Ibaraki; Motoyuki Kobayashi, Nara; Mitsurou Moriya, Ikoma, all of Japan

[73] Assignee: Matsushita Electric Industrial Co., Ltd., Kadoma, Japan

[21] Appl. No.: 429,681

[22] Filed: Apr. 27, 1995

[30] Foreign Application Priority Data

May 2, 1994 [JP] Japan ................... 6-093164
Sep. 19, 1994 [JP] Japan ................... 6-223718

[51] Int. Cl.[6] .................... G11B 7/00; G11B 5/09
[52] U.S. Cl. .................... 369/47; 369/50; 369/44.34; 369/44.36; 369/59
[58] Field of Search .................. 369/47, 48, 59, 369/124, 54, 50, 44.26, 44.35, 44.36, 44.34; 360/45, 51; 375/371, 376

[56] References Cited

U.S. PATENT DOCUMENTS 5,065,384 11/1991 Yokogawa ................... 369/47
5,090,003 2/1992 Watanabe et al. ................ 369/44.34
5,111,443 5/1992 Yokogawa ................... 369/48
5,353,271 10/1994 Abe ........................ 369/48
5,475,664 12/1995 Shimizume et al. ............. 369/54

FOREIGN PATENT DOCUMENTS 6231477 8/1994 Japan.

*Primary Examiner*—Thang V. Tran
*Attorney, Agent, or Firm*—Renner, Otto, Boisselle & Sklar

[57] ABSTRACT

A read-out information signal read out from an optical disk carrier is digitized, thereby detecting an amplitude of an absolute value of a phase error between the read-out information signal and a synchronized clock signal. The synchronized clock signal is obtained by using a phase locked loop constituted by a phase detector having two outputs, that is, a phase lead and a phase lag, and a VCO operating at an average value of a differential signal representing a difference between the two outputs. A phase error amplitude is detected from a sum signal representing a sum of the two outputs of this phase detector. By appropriately displacing a focus actuator in a state where a focus control is performed, an offset compensation amount where the phase error amplitude becomes minimum is obtained.

16 Claims, 11 Drawing Sheets

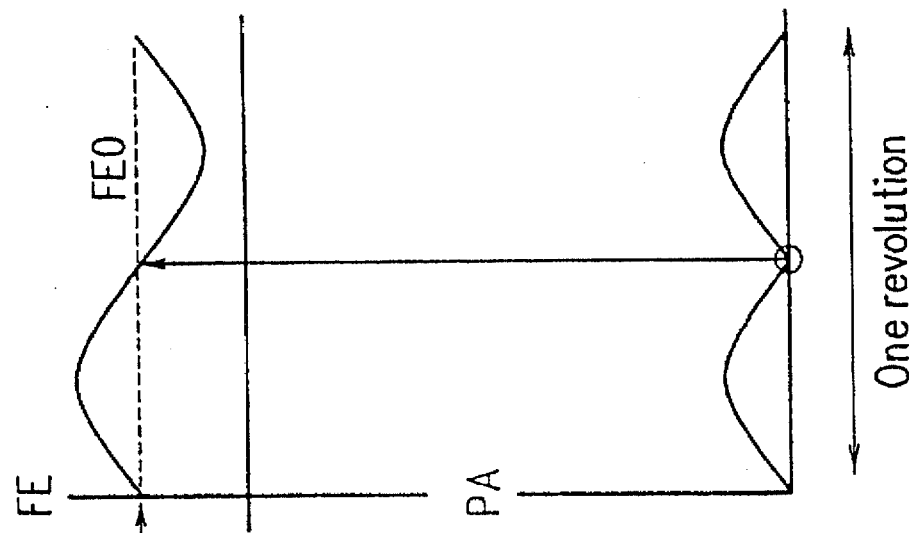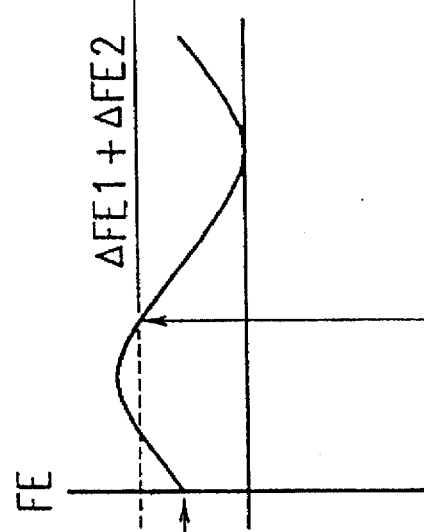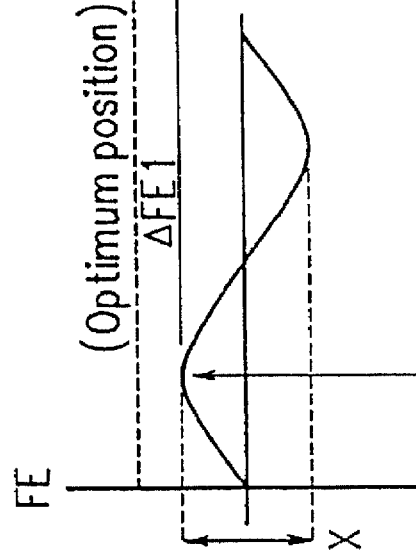

JITTER MEASUREMENT APPARATUS DETECTING AMPLITUDE OF PHASE ERRORS BETWEEN INFORMATION SIGNAL AND SYNCHRONIZED CLOCK SIGNAL

BACKGROUND OF THE INVENTION

1. Field of the Invention

The present invention relates to an optical disk drive apparatus usable for optimizing the focusing position of an optical pickup with respect to information recording surface of an optical disk medium.

2. Description of the Related Art

A conventional optical disk drive apparatus is, for example, disclosed in U.S. Pat. No. 5,090,003 (Feb. 18, 1992). An optical pickup includes: a laser diode; an objective lens; and a focus actuator, so that a concentrated laser beam is irradiated onto an optical disk. The optical pickup further includes a photo signal detector and a focus error detector. The photo signal detector reads information recorded on the optical disk via the objective lens, thereby outputting a read-out information signal. The focus error detector outputs a focus error signal having a level corresponding to the distance between a focusing position of the concentrated laser beam and the information recording surface of the optical disk. This focus error signal is fed back to the focus actuator through a focusing servo circuit, thereby maintaining the focus error constant. The position of the focus error detector is adjusted so that the focus error is "0", i.e., the focusing position is on the information recording surface, when the level of the focus error signal is "0".

However, the precision in locating the focus error detector is on the order of 10 µm, so that the position of the detector sometimes deviates after a long-term use. In such a case, even if the level of the focus error signal is "0", "an error of the focusing error" may be generated (here, such an error is called a "focus offset"). As a result, the concentrated laser beam on the information surface of the optical disk becomes broad, and therefore the recorded information can not be identified so precisely any longer. Consequently, an error rate in the read-out information signal becomes disadvantageously higher.

In order to eliminate such an error, according to a conventional technique, the following focusing control apparatus is proposed. An offset compensating signal is supplied to the focusing control system. By varying the level of the offset compensating signal, the variation in the amplitude of the information read-out signal is detected, thereby searching for a point where the amplitude reaches the maximum level. When the point at the maximum level is found, the amount for compensating the offset at the point is fixed, and thereafter the fixed amount is applied constantly to the focusing servo circuit. As a result, the focal point of the concentrated laser beam may be substantially fixed on the recording medium surface of the optical disk.

According to the conventional technique, however, it is difficult to detect a focusing position with a high precision because of the following problems. Specifically, the amplitude of the information read-out signal does not vary so sharply in accordance with the variation of the focus error, and in addition, the amplitude of the information read-out signal is disturbed by the uneven reflective index over the recording surface of an optical disk or fluctuation of a light emitting power of a laser diode.

SUMMARY OF THE INVENTION

The jitter detecting apparatus of the invention includes: a digitizing means for generating a digital pulse signal from an information signal based on an appropriate threshold value; and a phase error amplitude detection means for outputting a signal varying in accordance with an absolute value of a phase error between a leading edge or a trailing edge of the digital pulse signal and a reference signal generated being synchronized with the digital pulse signal. In the jitter detecting apparatus, the phase error amplitude detection means further includes: a phase detection means for detecting the phase error between the leading edge or the trailing edge of the digital pulse signal and the reference signal; a phase lock means for feedback controlling a frequency or a phase of the reference signal so that an average value of the phase error becomes zero; and a means for calculating the absolute value of the phase error.

In one embodiment, when the leading edge or the trailing edge of the digital pulse signal has a phase lead with respect to a synchronized clocksignal generated being synchronized with the digital pulse signal, the phase detection means generates a first signal having a pulse width corresponding to an amount of the phase lead; or when the leading edge or the trailing edge of the digital pulse signal has a phase lag with respect to the synchronized clock signal generated being synchronized with the digital pulse signal, the phase detection means generates a second signal having a pulse width corresponding to an amount of the phase lag; and the phase detection means outputs a differential signal representing a difference between the first signal and the second signal as a phase error signal; and the phase error amplitude detection means includes a means for obtaining the absolute value of the phase error by adding the first and the second signals.

In another embodiment, the jitter detecting apparatus includes: a phase detection means for transferring an offset pulse signal having a predetermined width to a first output and a second output when the leading edge or the trailing edge of the digital pulse signal is synchronous with the synchronized clock signal; transferring a pulse signal having a width obtained by adding a width corresponding to an arbitrary time period to the width of the offset pulse signal to the first output when the leading edge or the trailing edge of the digital pulse signal is advanced with respect to the synchronized clock signal by the arbitrary time period; and transferring a pulse signal having a width obtained by adding a width corresponding to an arbitrary time period to the width of the offset pulse signal to the second output when the leading edge or the trailing edge of the digital pulse signal is delayed with respect to the synchronized clock signal by the arbitrary time period; a phase lock means for controlling a frequency and a phase of the synchronized clock signal so that a value obtained by averaging the difference between the pulse signal at the first output and the pulse signal at the second output becomes zero; a time voltage conversion means for obtaining an OR signal of the pulse signals at the first and the second outputs as the absolute value of the phase error, thereby converting the pulse width of the OR signal into a voltage value; a means for generating a dummy pulse signal having the same width as that of the offset pulse signal in accordance with the edge of the digital pulse signal; and a compensation means for removing factors by the dummy pulse signal from the OR signal of the pulse signals at the first and the second outputs or from a signal obtained by voltage converting the OR signal.

In still another embodiment, the phase detection means includes: a first flip-flop in which an output state is varied in the leading edge and the trailing edge of the digital pulse signal; a second flip-flop in which an output state is varied in the leading edge of the synchronized clock signal; and a first gate element for resetting the first flip-flop and the second flip-flop when the outputs of the first flip-flop and the second flip-flop vary; and the compensation means includes: a third flip-flop in which an output state is varied in the leading edge and the trailing edge of the digital pulse signal; and a second gate element for resetting the third flip-flop by varying the output state of the third flip-flop, and the output of the first flip-flop is regarded as a first output; the output of the second flip-flop is regarded as a second output; and the output of the third flip-flop is regarded as a dummy pulse output.

In still another embodiment, the time-voltage conversion means includes: a capacitor for accumulating electrons while the sum signal of the pulse signals at the first and the second outputs is being output; a means for sampling and holding a voltage to be applied to terminals of the capacitor after an appropriate time period has passed from the leading of the information signal; and a means for discharging the electrons accumulated in the capacitor after an appropriate time period has passed from a sampling and holding time.

According to another aspect of the invention, an optical disk driving apparatus including: an optical disk carrier provided on a spindle motor; an optical pickup means including a laser emission means, an objective lens, a photo detection means, and a focus actuator; and a focus servo means for controlling the focus actuator so that a focus error signal obtained by optically detecting a distance between a focal point of a laser beam concentrated by the objective lens and the optical disk carrier is kept in a vicinity of a command reference is provided. The jitter detecting apparatus; and a focus error compensation means for displacing the focus actuator so as to minimize an output signal from the jitter detecting apparatus, thereby supplying a compensation signal with respect to the command reference to the focus control means are further provided.

In one embodiment, a focus control is performed when a residual error exists with respect to a surface deviation of the optical disk carrier, and a focus error signal when an output signal from the jitter detecting apparatus becomes minimum is held so as to be regarded as a compensation signal.

In another embodiment, the optical disk driving apparatus includes: a periodic signal generating means for generating a periodic signal synchronized with one revolution of the spindle motor, thereby displacing the focus actuator through the focus control means; an amplitude detecting means for detecting a varying amplitude of the focus error signal; and a variable amplifying means for arbitrarily varying the amplitude of the periodic signal so that the varying amplitude is within a predetermined range.

In still another embodiment, the optical disk driving apparatus includes: an amplitude detection means for detecting a varying amplitude X, where X is a varying amplitude of the focus error signal; and a differential calculation means for calculating $X_{max}-X$ with respect to the varying amplitude X, where $X_{max}$ is a predetermined value, wherein an amplifying rate of the variable amplifying means is determined by the output of the differential calculation means.

In still another embodiment, the optical disk driving apparatus includes: a tracking actuator and a tracking control means so that the focal point of the laser beam scans a spiral information track provided on the optical disk carrier; a buffer memory for temporarily writing a read-out information signal read out from the information track by using the laser beam and for reading out the information at a rate slower than the read-out information signal; a memory control means for executing and interrupting the write into the buffer memory; a means for supplying a signal for making the laser beam scan repeatedly an identical track turn during the write protect period to the tracking control means; and a means for generating a signal to the focus control means so as to displace a distance between the focal point and the optical disk carrier during the write protect period.

In still another embodiment, the optical disk driving apparatus includes a clock signal extracting means for separating and extracting an information clock signal from the read-out information signal. In the optical disk driving apparatus, the write into the temporary memory means is performed in synchronization with the information clock signal.

In still another embodiment, the optical disk driving apparatus includes: a signal generation means for vibrating not only the focus control means but also the focus actuator by generating a sinusoidal signal; and a compensation means for multiplying the output signal from the jitter detecting apparatus by the sinusoidal signal, thereby supplying a compensation signal to the focus control means so that an average value of the product of the multiplication is zero.

In still another embodiment, the optical disk driving apparatus includes: a focus error detection means for optically detecting a positional error between the focal point of the laser beam and the optical disk carrier, thereby transferring the error as a differential signal representing a difference between a first detection signal and a second detection signal; a first variable gain amplifier for amplifying the first detection signal with a first gain, a second variable gain amplifier for amplifying the second detection signal with a second gain, and a gain control means for reciprocally determining the first and the second gains based on a multiplication average value of the output signal from the jitter detecting apparatus: and the sinusoidal signal. A differential signal representing a difference between an output from the first variable gain amplifier end an output from the second variable gain amplifier is fed back to the focus actuator as the focus error signal through the focus control means.

In still another embodiment, a frequency of the sinusoidal signal is set to be equal to a band frequency of the focus control or less, and the sinusoidal signal is supplied to the multiplication means through a delay means for delaying a phase by a predetermined amount.

In still another embodiment, an optical element for forming two focal points in a direction of the optical axis is provided between the objective lens and the photo detection means, and the photo detection means is located at substantially a central position between the two focal points, and the photo detection means is composed of plural pairs of photo detection portions; an output obtained by synthesizing outputs from a first pair of photo detection portions is regarded as a first detection signal; and an output obtained by synthesizing outputs from a remaining second pair of photo detection portions is regarded as a second detection signal.

In still another embodiment, the first gain is expressed by $(1+\alpha)$; the second gain is expressed by $(1-\alpha)$; and the $\alpha$ is obtained from a signal calculated by temporarily integrating the multiplication average value of the output signal from the jitter detecting apparatus and the sinusoidal signal.

In a first example of the invention, the jitter measurement apparatus for detecting the absolute value of the phase error includes: a phase comparator for outputting the phase difference between the pulse readout information signal and the synchronized clock signal as two differential digitized pulse signals; a phase locked loop (PLL) for feedbacking the differential output from the phase comparator; end a pulse width-voltage converter for converting the pulse width of the OR signal of the two differential digitized pulse signals into a voltage and for outputting a jitter detection signal corresponding to the voltage. In this example, a method for displacing the focus actuator so as to minimize the jitter detection signal and optimize the focal point by using this jitter measurement apparatus for a optical disk drive will be described.

In a second example of the invention, an apparatus for displacing the focus actuator so that the sum of the residual focusing error caused by the surface deviation of the optical disk carrier and a periodic disturbance signal to be applied intentionally is constant will be described.

In a third example of the invention, an apparatus for optimizing the focal point in which the data is read out from the optical disk carrier at a higher transfer rate than a rate for reading the data from the buffer memory so as to be accumulated in the buffer memory; the reading out from the optical disk carrier is interrupted when the buffer memory becomes full will also be described.

In a fourth example, an apparatus for optimizing the focal point by applying a sinusoidal disturbance signal to the focus actuator and by applying an average value of the product of the jitter detection signal and the disturbance signal to the focusing control loop will be described.

Thus, the invention described herein makes possible the advantage of providing a jitter measurement apparatus for detecting an absolute value of a phase error of the leading edge and the trailing edge of the pulse signal obtained by digitizing the read-out information signal with respect to the reference signal, in place of the amplitude detector for the read-out signal.

This and other advantages of the present invention will become apparent to those skilled in the art upon reading and understanding the following detailed description with reference to the accompanying figures.

BRIEF DESCRIPTION OF THE DRAWINGS

FIGS. 5A to 5C are timing charts for describing the operation of the first example of the invention.

DESCRIPTION OF THE PREFERRED EMBODIMENTS

Figure 1:
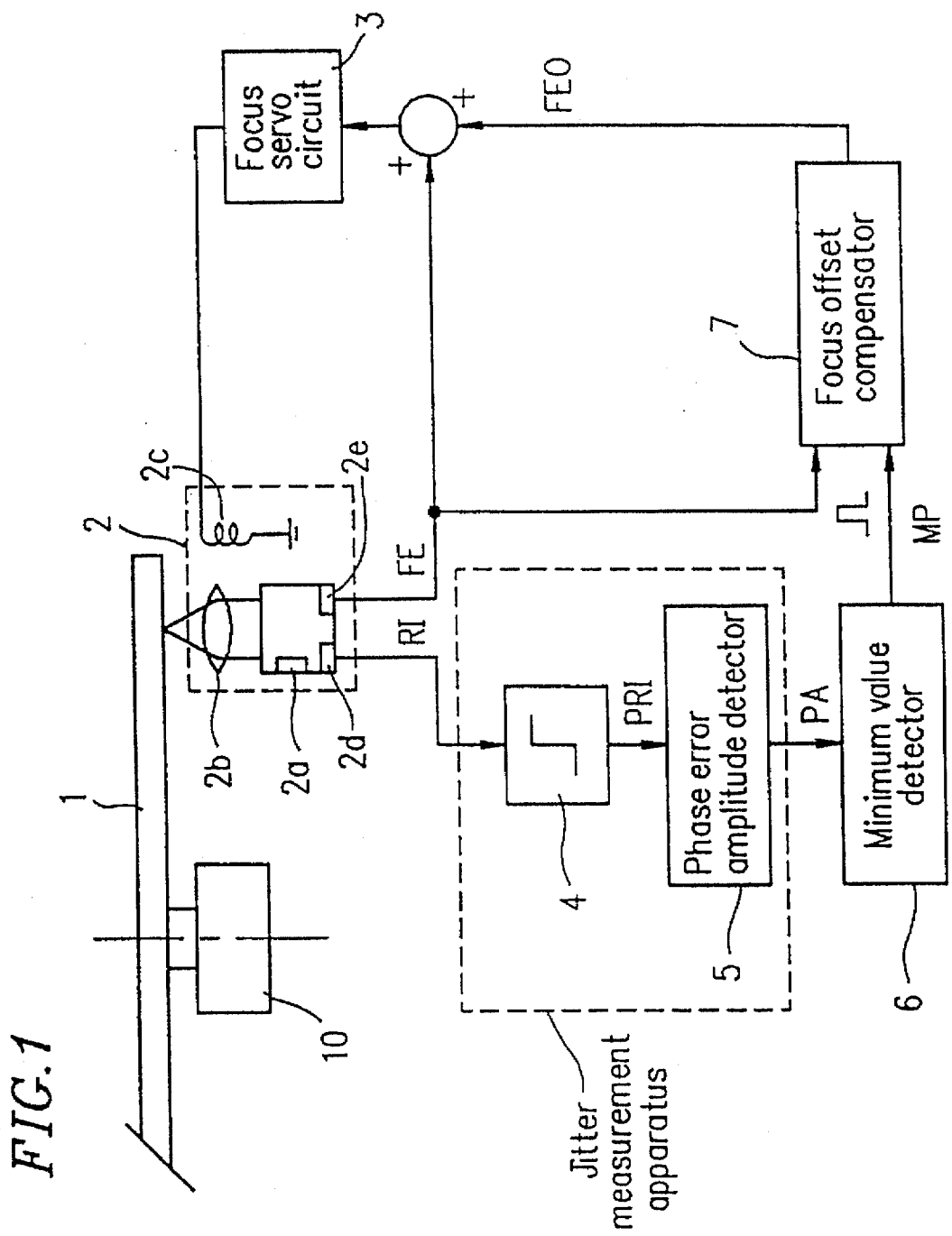
FIG. 1 is a block diagram of an optical disk drive apparatus incorporating a jitter detecting apparatus according to a first example of the invention.

Hereinafter, the present invention will be described by way of illustrative examples with reference to the accompanying drawings. It is noted that the same components are denoted by the same reference numerals throughout the following examples.

EXAMPLE 1

FIG. 1 is a block diagram of an optical disk drive apparatus using a jitter measurement apparatus according to a first example of the invention. In FIG. 1 an optical disk carrier 1 is attached to a spindle motor 10. An optical pickup 2 includes: a laser diode 2a; an objective lens 2b; a focus actuator 2c; a photo signal detector 2d; and a focus error detector 2e. The optical pickup 2 irradiates a concentrated laser beam on the optical disk carrier 1. The photo signal detector 2d outputs information recorded on the optical disk carrier 1 read by the laser beam through the objective lens 2b as a read-out information signal (RI signal). The focus error detector 2e outputs an amount corresponding to a distance between a focusing position of the concentrated laser beam and an information recording surface of the optical disk carrier 1 as a focus error signal (FE signal). The FE signal is fed back to an objective lens actuator of the optical pickup via a focus servo circuit 3. As a result, a distance between the focusing position and the information recording surface is kept constant.

A jitter measurement apparatus in FIG. 1 includes a digitizing circuit 4 and a phase error amplitude detector 5. The digitizing circuit 4 digitizes the RI signal reproduced by the optical pickup 2 with an appropriate threshold level, thereby outputting a pulse signal (PRI). The phase error amplitude detector detects a phase error amplitude, i.e., an absolute value of the phase error, of a leading edge and trailing edge of the RI pulse signal with respect to a synchronized clock signal and outputs the absolute value as a jitter detection signal (PA signal). A minimum value detector 6 generates a detection pulse signal MP when the minimum value detector 6 detects a minimum value (a local minimum value) of the jitter detection signal PA.

The distance between the focal point of the laser beam irradiated through the objective lens 2b and the information recording surface of the optical disk carrier 1 may be kept substantially constant by using the focus error detector 2e, the focus servo circuit 3 and the focus actuator 2c. However, as described in the above related art, this focal point is not always positioned precisely on the information recording surface. This is because an "error" exists in the focus error detector 2e itself (hereinafter, such an error will be called an "offset").

Figure 2A:
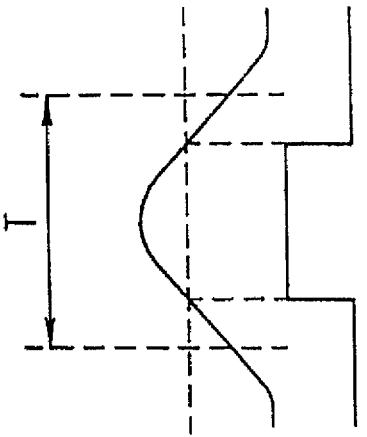
FIGS. 2A to 2C are timing charts for describing the operation of the first example of the invention.
Figure 2B:
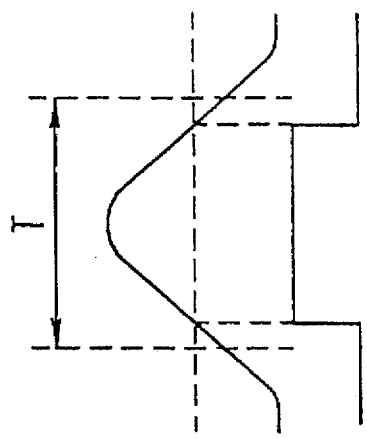
Figure 2C:
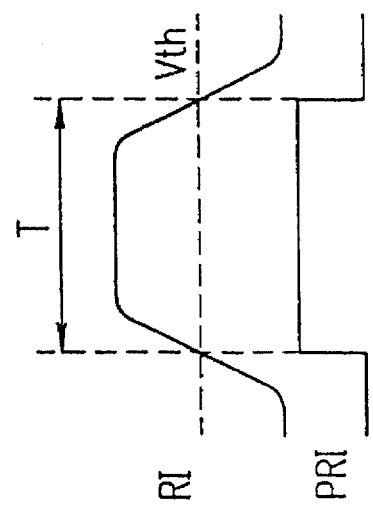

FIGS. 2A to 2C show the variation of the respective waveforms of the read-out information signal RI and the pulse signal PRI with respect to the amount of the focus offset. When no focus offset exists in the focus error detector 2e, the photo signal detector 2d of the optical pickup 2 outputs a read-out information signal as shown in FIG. 2A. The output is digitized by the digitizing circuit 4, so that the pulse signal PRI is generated using the potential Vth as a threshold value. The pulse signal PRI has a predetermined pulse width T. The pulse width T generally corresponds to the fundamental cycle of the synchronized clock signal included in the data recorded on the optical disk carrier 1, or a cycle of an integer times as long as the fundamental cycle. On the other hand, in the case where the amount of the focus offset exists, the waveform of the read-out information signal RI varies as shown in FIG. 2B depending on the amount of the focus offset. That is to say, if the focus offset exists, then the spot diameter of the concentrated laser beam irradiated on the information recording surface of the optical disk carrier 1 enlarges, so that the resolution in detecting the recorded information decreases. As a result, both edges of the waveform of the read-out information signal RI are blunted as if the signal were filtered by a low-pass filter. In such a case, the fundamental components included in the read-out information signal RI are not reduced, but the high frequency factors are reduced. The gradients of the leading edge and the trailing edge of the read-out information signal RI become less acute, so that the pulse width of the resulting pulse signal PRI becomes shorter than the width T. If the amount of the focus offset further increases, then the fundamental components are also reduced in amplitude as shown in FIG. 2C, so that the peak value itself of the read-out information signal RI is lowered. In this example, a case where the pulse width becomes smaller as the amount of the focus offset increases has been described. To the contrary, depending on the pattern of the recorded data, in some cases, the pulse width becomes larger.

In any case, if the focus offset increases, before the fundamental component of the read-out information signal reduces in amplitude, the leading edge or the trailing edge of the resultant pulse read-out information signal vary at random on the time axis with respect to the synchronized clock (this variation is generally called "a jitter"). By detecting the litter of the readout information signal, the focus offset amount may be detected at a higher sensitivity as compared with the case of detecting the variation of the amplitude of the read-out information signal. The jitter may be detected at a high speed by using the jitter measurement apparatus of the invention including the digitizing circuit 4 and the phase error amplitude detector 5 though the construction of the circuit is simple.

Figure 3:
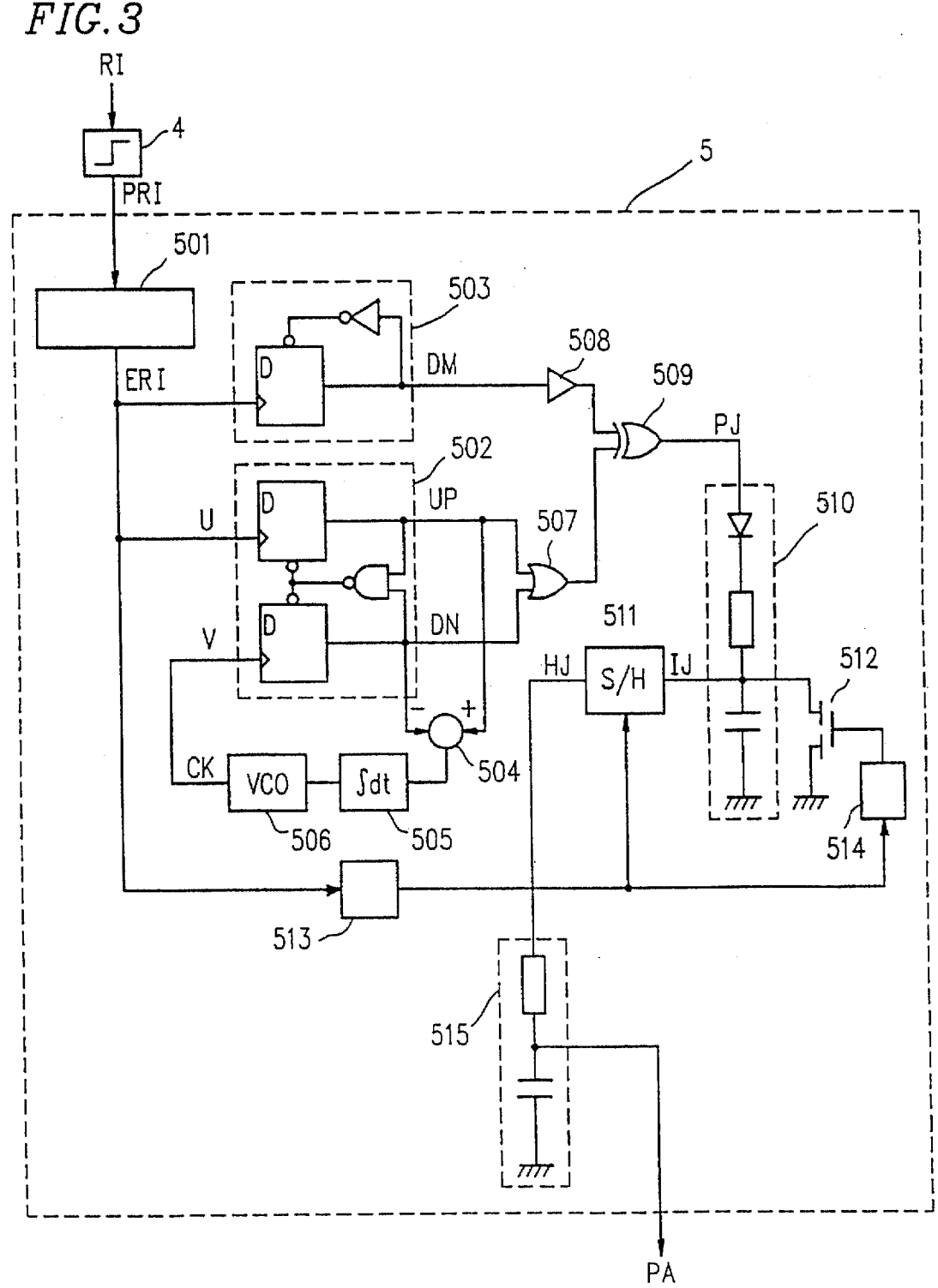
FIG. 3 is a circuit diagram of a jitter detecting apparatus according to the first example of the invention.
Figure 4:
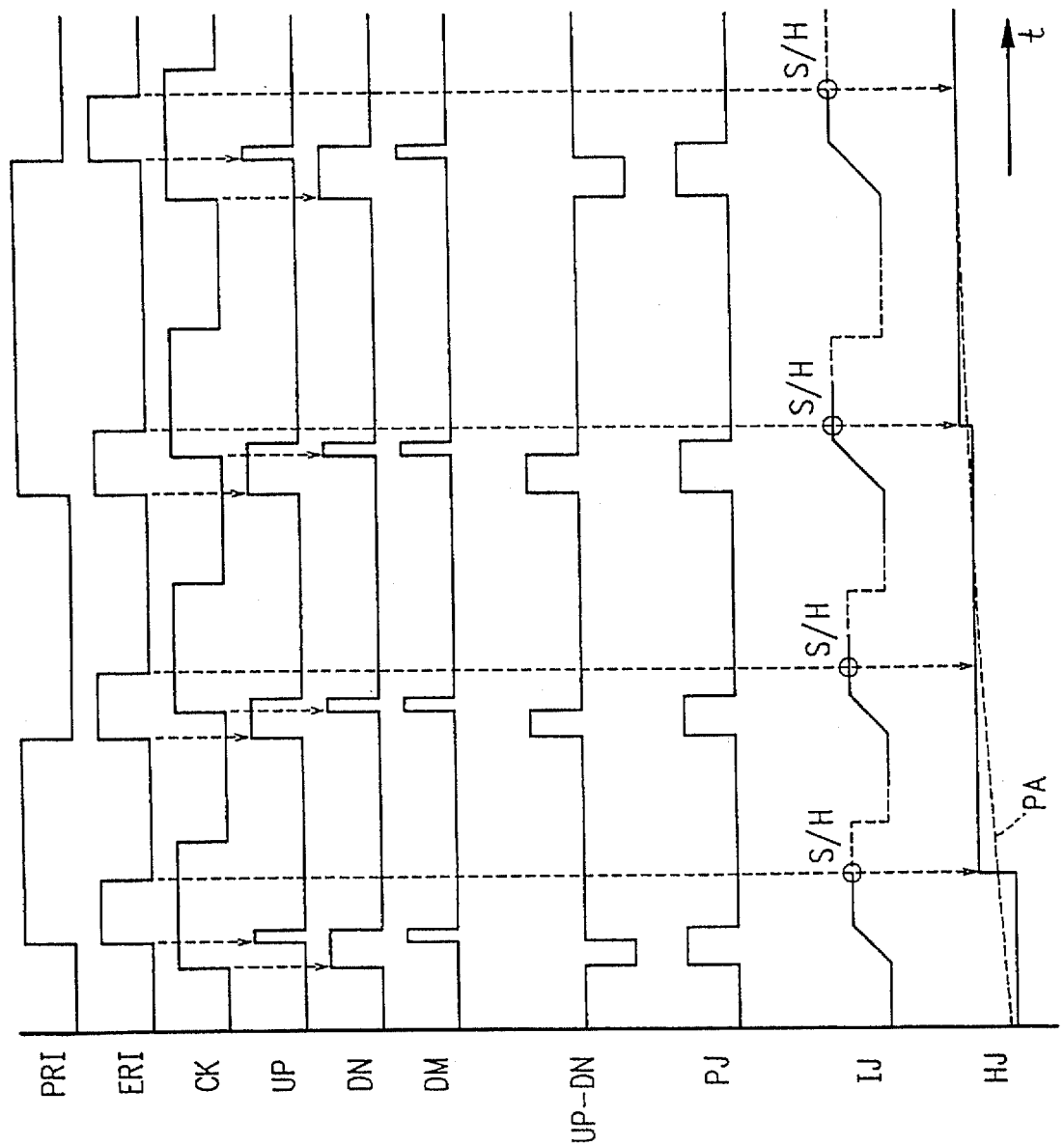
FIG. 4 is a timing chart for describing the operation of the circuit shown in FIG. 3.

FIG. 3 is a diagram showing an exemplary configuration of the phase error amplitude detector 5. FIG. 4 shows the waveforms of the respective components thereof. An edge detector 501 outputs an edge signal corresponding to the leading edge and the trailing edge of the digitized pulse signal PRI as shown in FIG. 4. A phase lock loop (PLL) is formed by a phase detector 502, a differential amplifier 504, a charge pump 505 and a voltage controllable oscillator (VCO) 506. That is to say, the edge signal ERI is supplied to the input U of the phase detector 502, and the synchronized clock signal CK is supplied to the input V of the phase detector 502 as shown in FIG. 4. In the case where the edge signal ERI has a phase lead with respect to the synchronized clock signal CK, a pulse signal having a pulse width corresponding to the phase lead is output to the output UP. To the contrary, in the case where the edge signal ERI has a phase lag with respect to the synchronized clock signal CK, a pulse signal having a pulse width corresponding to the phase lag is output to the output DN. A differential signal of both outputs UP and DN is smoothed, and then supplied to VCO 506. As a result, an average value of a phase error between the edge signal ER1 and the synchronized clock signal CK may be reduced to zero. However, even though the average value is zero, the phase of the edge signal ERI and the phase of the synchronized clock signal CK are not completely in phase. This is because there exists minute continuous variations of phase lead and phase lag around zero, i.e., the jitter exists. In order to detect this jitter for focusing control in either case of phase lead and phase lag, it is sufficient to measure the absolute value (amplitude) of the jitter. Accordingly, a pulse width of logic summation signal of the output UP and DN is measured by using an OR gate 507.

In this case, however, it is necessary to remove the offset pulse caused by the delay occurring in circuit elements to be used as the phase detector 502. In the case of using an ideal circuit element, i.e., a circuit element where no delay occurs, if signals in phase are input to the inputs U and V simultaneously, signals with a pulse width of zero (i.e., extremely narrow pulse signals) are output from the outputs UP and DN. However, in actuality, an offset pulse signal having a pulse width corresponding to the delay of the flip-flops and the NAND gate constituting the phase detector 502 is output as shown in FIG. 4. In the case of using the difference between the outputs UP and DN of the phase detector 502 for the PLL, the offset portions are cancelled out by each other, so no problem arises. In the case of using OR signal of the outputs UP and DN as used in this example, however, the offset component is added. Therefore, in this example, by using a group of circuit elements 503 having a delay characteristic represented by the same amount of delay of the flip-flops and the NAND gate, a dummy pulse DM is generated, and the offset component is removed by an exclusive OR gate 509. A buffer 508 is provided for adjusting the timings and has the same delay amount as that of an OR gate 507.

The jitter pulse signal PJ thus generated is supplied to an integrating circuit 510 constituted by a diode switch and a low-pass filter. As shown in FIG. 4, the jitter pulse signal PJ is integrated, that is to say, is pulse width-voltage converted so as to be a voltage signal IJ. A sample and hold circuit 511 samples and holds this voltage signal IJ, thereby outputting the signal as a hold signal HJ. The timing for sampling and holding is determined by a delay element 513 with respect to the input U. This timing is further delayed by a delay element 514 and the capacitor of the integrating circuit 510 is discharged by the switch 512. FIG. 4 shows how the hold signal HJ is generated from the pulse signal PJ. The hold signal HJ is further averaged by a low-pass filter 515, so as to be output as a jitter detection signal PA.

The minimum value detector 6 and the focus offset compensator 7 applies the compensating offset signal FEO to the focusing servo system so that the generated jitter detection signal PA becomes minimum. The level of the compensating offset signal FEO may be fixed at an optimal point which is searched for while varying the level of the compensating offset signal FEO. In this example, a method for utilizing the surface deviation which the optical disk carrier itself has will be first described.

FIGS. 5A to 5C show the relation between the FE signal and the jitter detection signal PA when a focus offset exists. Even if a focus servo is performed, a residual error, shown in FIG. 5 as a sinusoidal signal having an amplitude of X, is generated from being affected by the surface deviation of the optical disk carrier 1. Therefore, the focus servo is performed so that the average value of the focus error is constant while some periodical displacement is generated. In the case where the focus offset exists in a steady-state condition, even if the focus error is zero, the focal point does not exist on the recording surface of the optical disk carrier. In the case where the focus offset is larger than the amplitude of the residual error as shown in FIG. 5a, the jitter detection signal PA becomes minimum when the focal point comes closest to the recording surface of the optical disk carrier 1. When the minimum value detector 6 detects the minimum value of the jitter detection signal PA, the minimum value detector 6 outputs a pulse signal MP. The focus offset compensator 7 samples the focus error signal FE at the timing of the pulse signal MP, thereby outputting the sampled value $\Delta FE_1$ as a compensating offset signal to the focus servo circuit 3. As a result, the focus offset is reduced by $\Delta FE_1$ (FIG. 5B). In the case where the optimum focus position exists within a periodic displacement, the level of the jitter detection signal PA becomes minimum when the focal point crosses through the recording surface of the optical disk carrier, as shown in FIG. 5B. At the point where the level becomes minimum, the focus error signal is sampled again and the sampled signal is added to the focus servo circuit 3 as a compensating offset signal $\Delta FE_2$, thereby making the optimum focusing position onto the center of the periodic displacement (FIG. 5C). Consequently, the initial focus offset is cancelled by supplying the compensating offset signals $\Delta FE_1$ and $\Delta FE_2$ twice. In actuality, in the course of processing as shown in FIGS. 5A, 5B and 5C, the asymptotic processing is required to be performed several times in each step. In addition, in order to compensate the focus offset in accordance with the time-dependent variation, it is preferable to constantly perform the compensation expressed by the following equation:

$$FEO_i = FEO_{i-1} + \Delta FE_x$$

where $FEO_{i-1}$ indicates the compensating offset amount FEO at the (i–1) th processing (last time); $FEO_i$ indicates the compensating offset amount FEO at the i-th processing (this time); and $\Delta FE_x$ indicates the compensating offset amount FEO which has been newly added at the present processing.

As described above, in this example, by detecting the focus offset by a high sensitivity and by compensating the focus offset, the optimum focusing position may be searched for with a high precision. In this example, a phase error amplitude detector 5 of the type as shown in FIG. 3 is used. However, any type of detector may also be used as the phase error amplitude detector 5, so long as the phase error amplitude may be detected univalently. For example, if the offset pulse is a negligible one, the circuit for generating a dummy pulse may be omitted from the phase error amplitude detector shown in FIG. 3, and a DC offset voltage may be eliminated from the jitter detection signal PA including the offset component. In this example, the optimum focusing position is searched for, assuming that some residual focus servo error exists because of the surface deviation of the optical disk carrier. However, in the case where the surface deviation of the optical disk carrier is very small, the optimum focusing position can not be properly searched for. A method for solving this problem will be described below.

EXAMPLE 2

Figure 6:
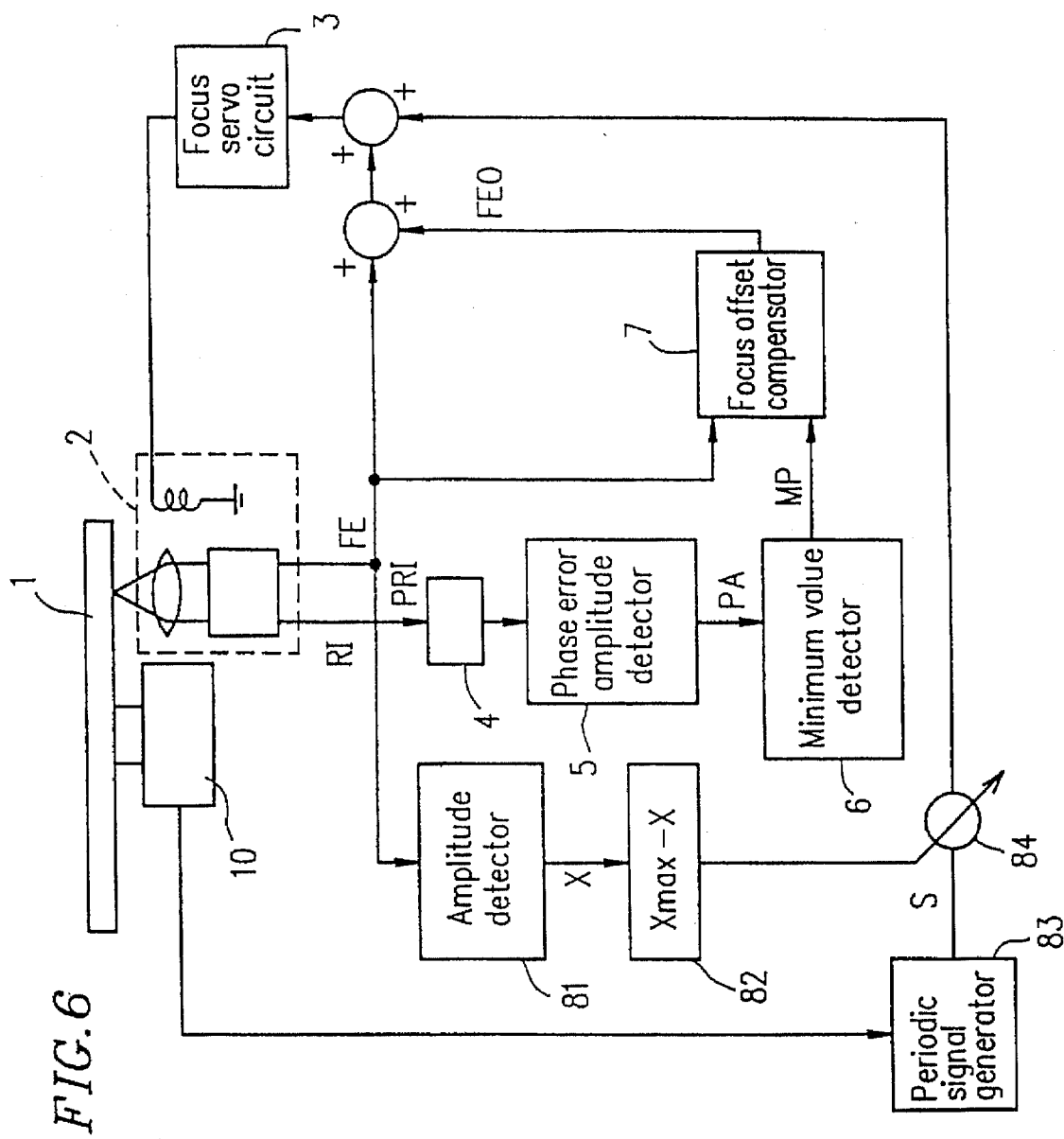
FIG. 6 is a block diagram of an optical disk drive apparatus according to a second example of the invention.

FIG. 6 is a block diagram of an optical disk drive apparatus according to a second example of the invention. The optical disk focusing control apparatus of this example also includes: an optical disk carrier 1; a spindle motor 10; a focus servo circuit 3; a digitizing circuit 4; a phase error amplitude detector 5; a minimum value detector 6; and a focus offset compensator 7, all of which have the same functions as those described in the first example. An amplitude detector 81 detects the amplitude of the residual error of the focus error signal FE, thereby outputting the amplitude as the output X. For example, the amplitude detector 81 samples and holds the local maximum value and the local minimum value of the focus error signal FE, thereby calculating the difference between the two values. A differential amplifier 82 generates an output $(X_{max}-X)$ corresponding to the output X, where $X_{max}$ is a constant. The constant $X_{max}$ determines a maximum value of the focus displacement as will be described later. A variable gain amplifier 84 amplifies an output S output from a periodic signal generator 83 with the gain proportional to $(X_{max}-X)$, thereby applying a resulting signal to the focus servo circuit 3.

Herein, if the surface deviation of the optical disk carrier 1 does not occur, then X is zero. In such a case, the variable gain amplifier 83 amplifies the sinusoidal disturbance signal S with the maximum gain $X_{max}$. As a result, the focus lens actuator vibrates in the direction of the optical axis of the laser beam. On the other hand, if the surface deviation occurs and if the amount of the focus displacement caused by the surface deviation is $X_{max}$, then the gain of the variable gain amplifier 83 also becomes zero, so that the forcible disturbance signal S is not input to the focus servo circuit 3. Consequently, the residual error of the amplitude $X_{max}$ is always generated in the distance between the recording surface of the optical disk carrier 1 and the focal point of the laser beam, irrespective of the dimension of the surface deviation.

The constant $X_{max}$ is required to be a value not affecting the read-out characteristics, and therefore it is preferably about a half of the focal depth of the laser beam emitted from the optical pickup or less. For example, in the case where the laser wavelength $\lambda$ is 800 nm and the NA of the beam is 0.5, the focal depth $\pm \lambda/2NA^2$ is $\pm 1.6$ μm. Accordingly, $X_{max}$ may be 0.8 μm or less.

Next, a case where the surface deviation of the optical disk carrier 1 is large and the residual focus error caused by the surface deviation is larger than $X_{max}$ will be described below. In the case where the periodic disturbance signal S is generated at the cycle completely synchronized with the cycle of the residual error, the circuit shown in FIG. 6 operates so as to reduce this residual error. In other words, since X is larger than $X_{max}$, the gain $(X_{max}-X)$ of the disturbance signal S becomes smaller than zero, so that a signal in an opposite phase to that of the residual error is supplied to the focus servo circuit 3. As a result, the residual focus error becomes smaller.

Figure 7:
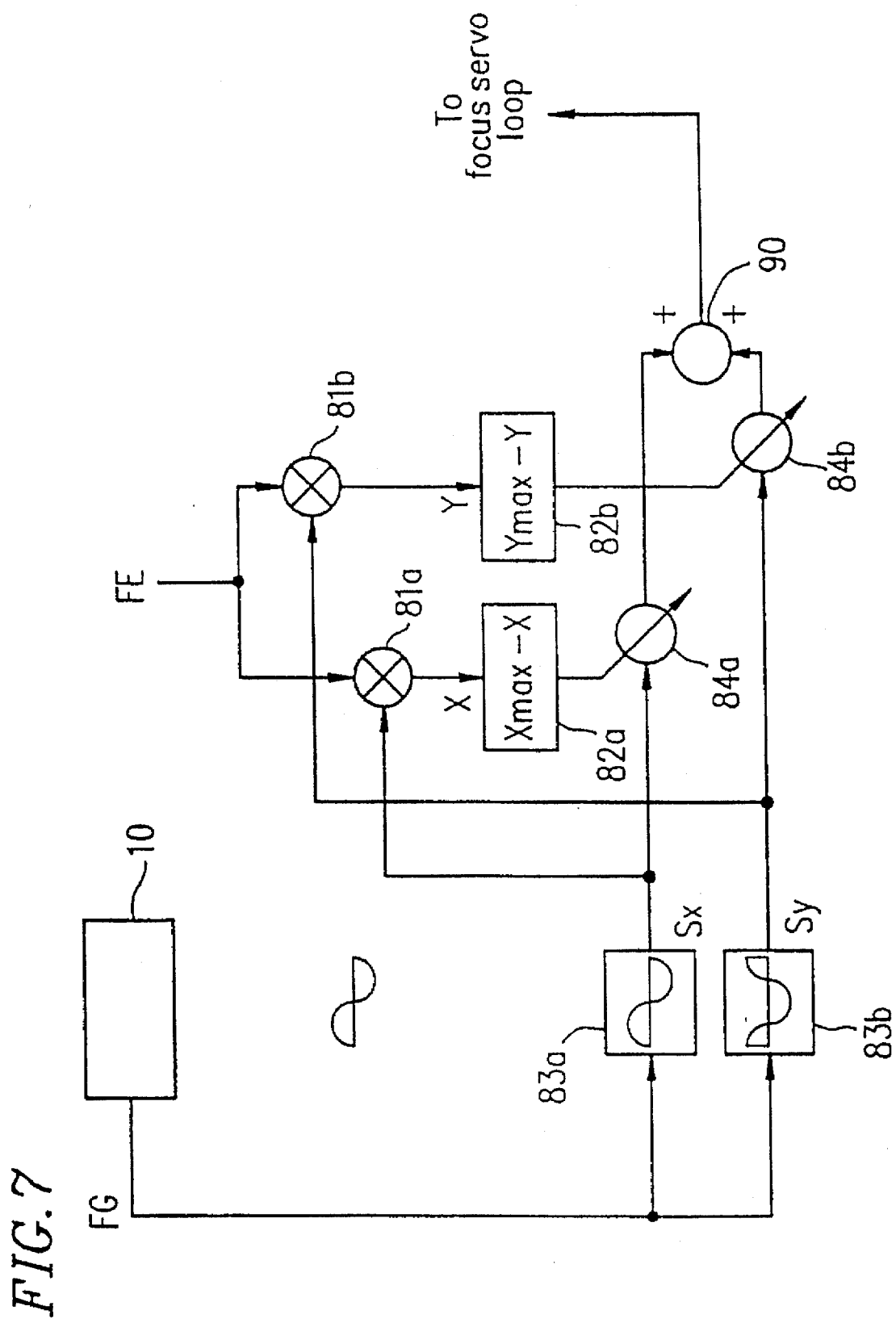
FIG. 7 is a block diagram of an alternative optical disk drive apparatus according to the second example of the invention.

However, in some cases, if the residual focus error and the periodic disturbance signal S are not in phase, the residual focus error is increased to the contrary. FIG. 7 shows an exemplary circuit for solving this problem. A amplitude detectors 81a and 81b detect the orthogonal factors of the varying residual focusing error, that is to say, the amplitude X of the sine factor and the amplitude Y of the cosine factor. Differential amplifiers 82a and 82b calculate the respective differences $(X_{max}-X)$ and $(Y_{max}-Y)$, with respect to the amplitudes X and Y constituting the orthogonal factors. Variable gain amplifiers 84a and 84b amplify the respective periodic disturbance signals Sx and Sy with the gains of $(X_{max}-X)$ and $(Y_{max}-)$. The disturbance signals Sx and Sy are generated by respective periodic disturbance signal generators 83a and 83b being synchronized with the rotation of the spindle motor 10. In order to generate these signals, for example, the waveform data of the sine wave and the cosine wave is stored beforehand in a read-only memory (ROM), and the data is read out sequentially in accordance with the revolution clock signal supplied from the spindle motor 10. The adder 90 receives and adds the outputs from the variable gain amplifiers 84a and 84b, thereby outputting the sum to the focus servo circuit 3. Since the respective orthogonal factors of the residual focus error are synchronous with the periodic disturbance signals Sx and Sy, the amplitudes of the respective sums are always kept at $X_{max}$ and $Y_{max}$, respectively.

EXAMPLE 3

Figure 8:
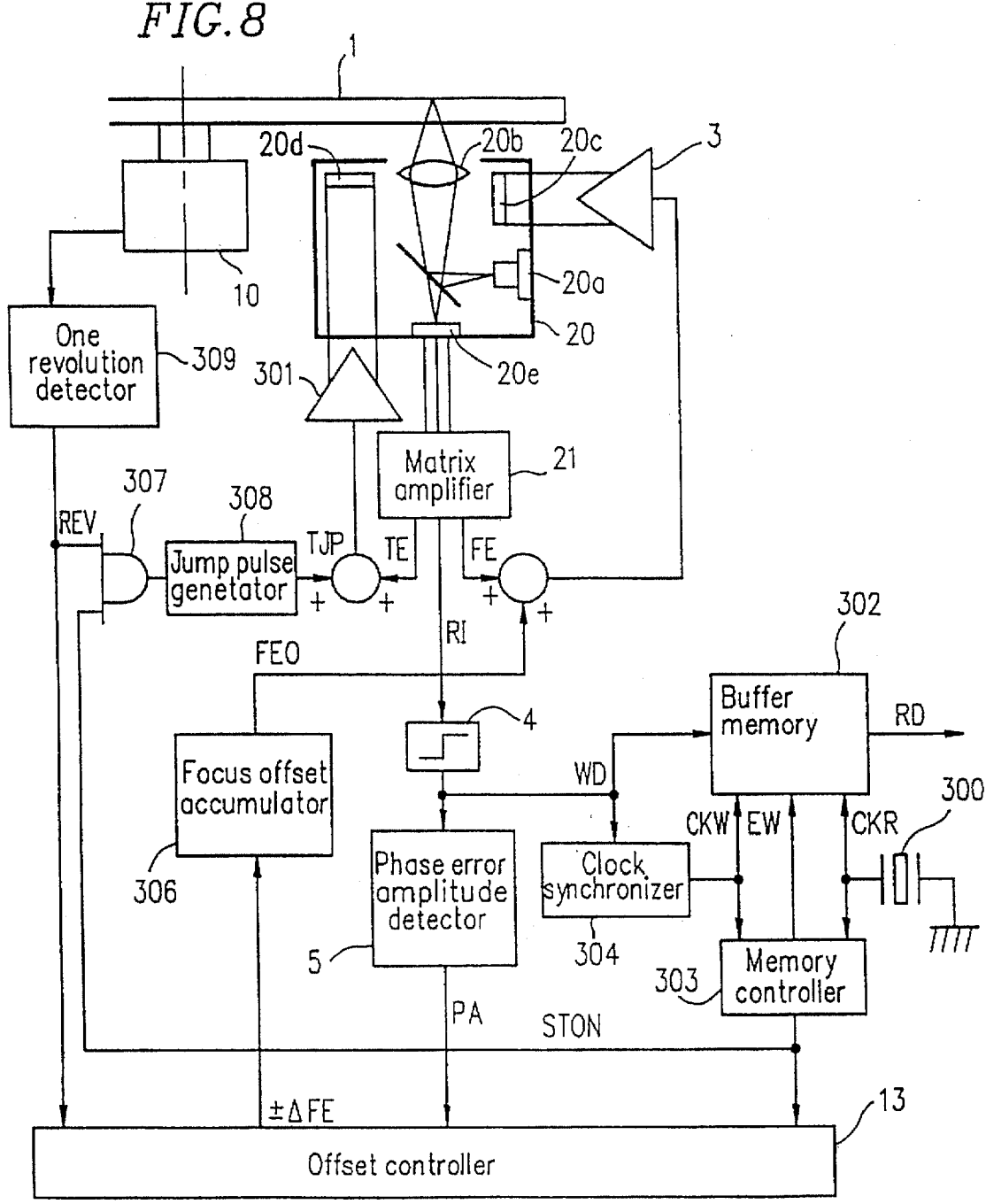
FIG. 8 is a block diagram of an optical disk drive apparatus according to a third example of the invention.

FIG. 8 is a block diagram of an optical disk drive apparatus according to a third example of the invention. The optical disk drive apparatus of this example also includes: an optical disk carrier 1; a spindle motor 10; a digitizing circuit 4; and a phase error amplitude detector 5, all of which have the same functions as those described in the first example. An optical pickup 20 includes: a laser diode 20a; an objective lens 20b; a focus actuator 20c; a tracking actuator 20d and a photo detector array 20e including a plurality of light receiving portions. A matrix amplifier 21 receives the output signals from the photo detector array 20e, thereby outputting a focus error signal FE, a tracking error signal TE and a read-out information signal RI. The focus error signal FE and the tracking error signal TE are input to the focus actuator 20c and the tracking actuator 20d, through a focus servo circuit 3 and a tracking servo circuit 301 respectively, so that a feedback loop is formed.

A one revolution detector 309 outputs a revolution detection pulse REV by detecting every revolution of the spindle motor 10. When the revolution detection pulse REV is generated, a track jump pulse generator 308 outputs a track jump pulse TJP. The sum of the track jump pulse TJP and the tracking error signal TE is input to the tracking servo circuit 301. The tracking servo circuit 301 drives the tracking actuator 20d, thereby performing a track still jumping.

A digitized write data WD is written into a buffer memory 302 synchronized with the write clock CKW generated by a clock synchronizer 304. On the other hand, a read data RD is read from the buffer memory 302 synchronized with a read clock CKR generated by the clock generator 300. In this case, the frequency of the write clock CKW is higher than the frequency of the read clock CKR.

The memory capacity of the buffer memory 302 is limited. Accordingly, if the read-out rate of the data is higher than the write-in rate of the data, then the buffer memory 302 overflows. Therefore, when the remaining capacity of the buffer memory 302 becomes small, a memory controller 303 turns thaw rite enable EW from "H" into "L", thereby prohibiting the write operation. As a result, the write operation is interrupted until the data in the buffer memory 302 is sufficiently empty. The remaining capacity of the buffer memory 302 may be detected by counting up the write clock CKW and the read clock CKR and by comparing the difference between the two clocks with the entire memory capacity. In this case, if the information is continuously read out from the optical disk carrier, then the information in the write prohibiting period for the buffer memory 302 will be lost. Accordingly, the track still jumping is required to be performed at the timing when the write operation is interrupted. That is to say, the laser beam is required to be returned to a track immediately before the current track for every revolution of the optical disk carrier. An instruction signal STON for returning the laser beam to the track immediately before the current track is generated by the memory controller 303. The one revolution detector 309 generates a revolution detection pulse REV by detecting every revolution of the spindle motor 10 (i.e., that of the optical disk carrier 1). The revolution detection pulse REV and the instruction signal STON opens an AND gate 307. The jump pulse generator 308 applies the track Jump pulse TJP consisting of an acceleration pulse (positive) and the deceleration pulse (negative) to the tracking servo loop. As a result, a track still jumping is performed.

An optimum focusing position is searched for during the still tracking. When the offset controller 305 receives the instruction signal STON, the controller 305 generates a positive or negative offset fine adjustment signal +ΔFE or −ΔFE. This fine adjustment signal is accumulated and added by the focus offset accumulator 306 and then added so as to be applied to the focusing servo loop as the compensating offset signal $FE_0$. In this case, if a focus offset exists in an opposite direction to that of the offset fine adjustment signal, the focus offset is reduced. However in some cases, to the contrary, the focus offset is enlarged. In order to determine whether the focus offset is reduced or enlarged, the jitter detection signal PA is utilized. Following is an exemplary algorithm for minimizing the jitter detection signal PA.

Step 1: adding +ΔFE
Step 2: returning to Step 1 if PA<$PA^{-1}$
Step 3: proceeding to Step 4 if PA≧$PA^{-1}$
Step 4: adding −ΔFE
Step 5: returning to Step 4 if PA<$PA^{-1}$
Step 6: returning to Step 1 if PA≧$PA^{-1}$ where $PA^{-1}$ indicates a jitter detection signal of the last track before the contemporary offset fine adjustment signal is applied.

Figure 9:
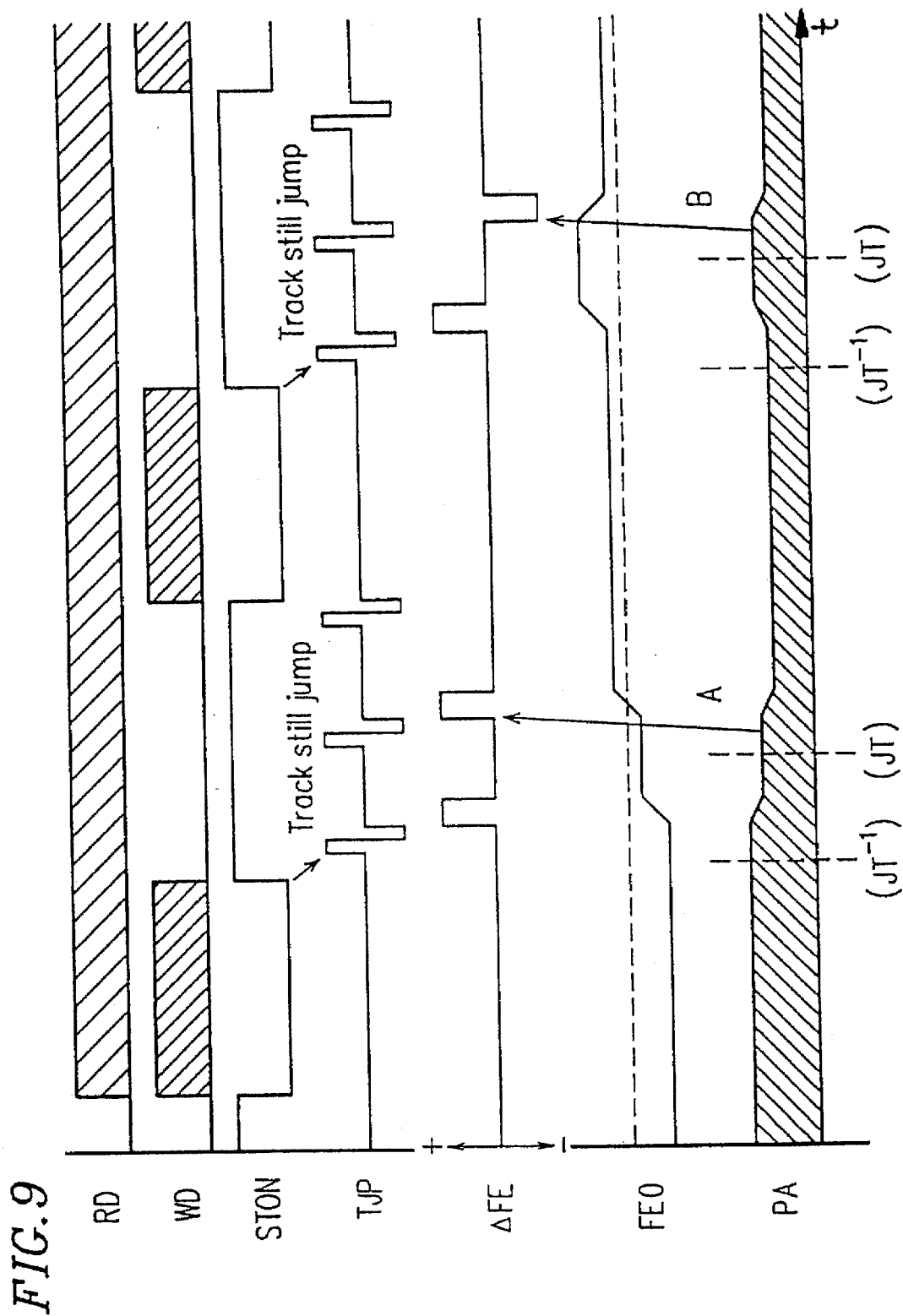
FIG. 9 is a timing chart for showing the operation of the apparatus shown in FIG. 8.

In order to reduce the level of the jitter detection signal PA by performing this algorithm, a positive or negative offset fine adjustment signal +ΔFE or −ΔFE is continuously applied. For example, the operations of Steps 2 and 3 are shown in parts A and B of FIG. 9. Assuming that the jitter detection signal PA may be sufficiently reduced by accumulating after adding the offset fine adjustment signals, the compensating offset signal $FE_0$ has an appropriate compensating offset amount. The smaller the absolute amount of ΔFE is, the more precisely the adjustment may be performed. However, since the search time becomes longer in such a case, the absolute amount is preferably about one tenth of the focal depth. In an optical system where the NA is 0.5 and the wavelength λ is 800 nm, the focal depth λ/2 $NA^2$ is 1.6 μm, for example. Therefore, |ΔFE| is preferably about 0.16 μm.

While this algorithm is being performed, new information is not read out from the optical disk carrier 1, but the information accumulated in the buffer memory 302 is read instead so as to be output. When the buffer memory 302 comes closer to being empty, the memory controller 303 ceases the generation of the instruction signal STON, and starts the read operation of the information from the optical disk carrier again. That is to say, the track lump is stopped by closing the gate 307, thereby starting the continuous read-out. And by turning the write enable EW from "L" into "H", the write operation of the data into the buffer memory 302 is started again. At the same time, the offset controller 305 interrupts the search. In order not to interrupt the search with an ambiguous offset added, the algorithm indicated by the following Steps 7 and 8 are required to be performed beforehand.

Step 7: if PA<$PA^{-1}$, then the processing is interrupted,
Step 8: if PA≧$PA^{-1}$, then the processing is interrupted after applying a fine adjustment signal having an opposite polarity to that of the previous signal.

Thereafter, similar steps are performed repeatedly. That is to say, if the buffer memory 302 is close to overflow again, then the instruction signal STON is generated, thereby starting the algorithm again.

As described above, in this example, a focus adjusting operation is performed during the intervals between the intermittent reproductions. That is to say, by applying small amount of offset during performing a track still jumping for an intermittent reproduction, the optimum focusing position may always be searched for without affecting the reproduction of the data.

In this example, the fine adjustment signal ΔFE is constant. Alternatively, the signal may be obtained by appropriately varying an absolute amount. More specifically, the level of the signal may be relatively high, e.g., 0.3 µm, at the beginning of a series of adjustments, and may be a reduced fine adjustment amount, e.g., 0.1 µm, when the signal comes closer to the optimum focusing position.

The clock extractor 11 used in this example is generally replaced with a PLL. In the case of using a PLL, the synchronized clock signal CK generated by the PLL (FIG. 3) used as the phase error amplitude detector 5 may be used as the write clock CKW.

EXAMPLE 4

Figure 10:
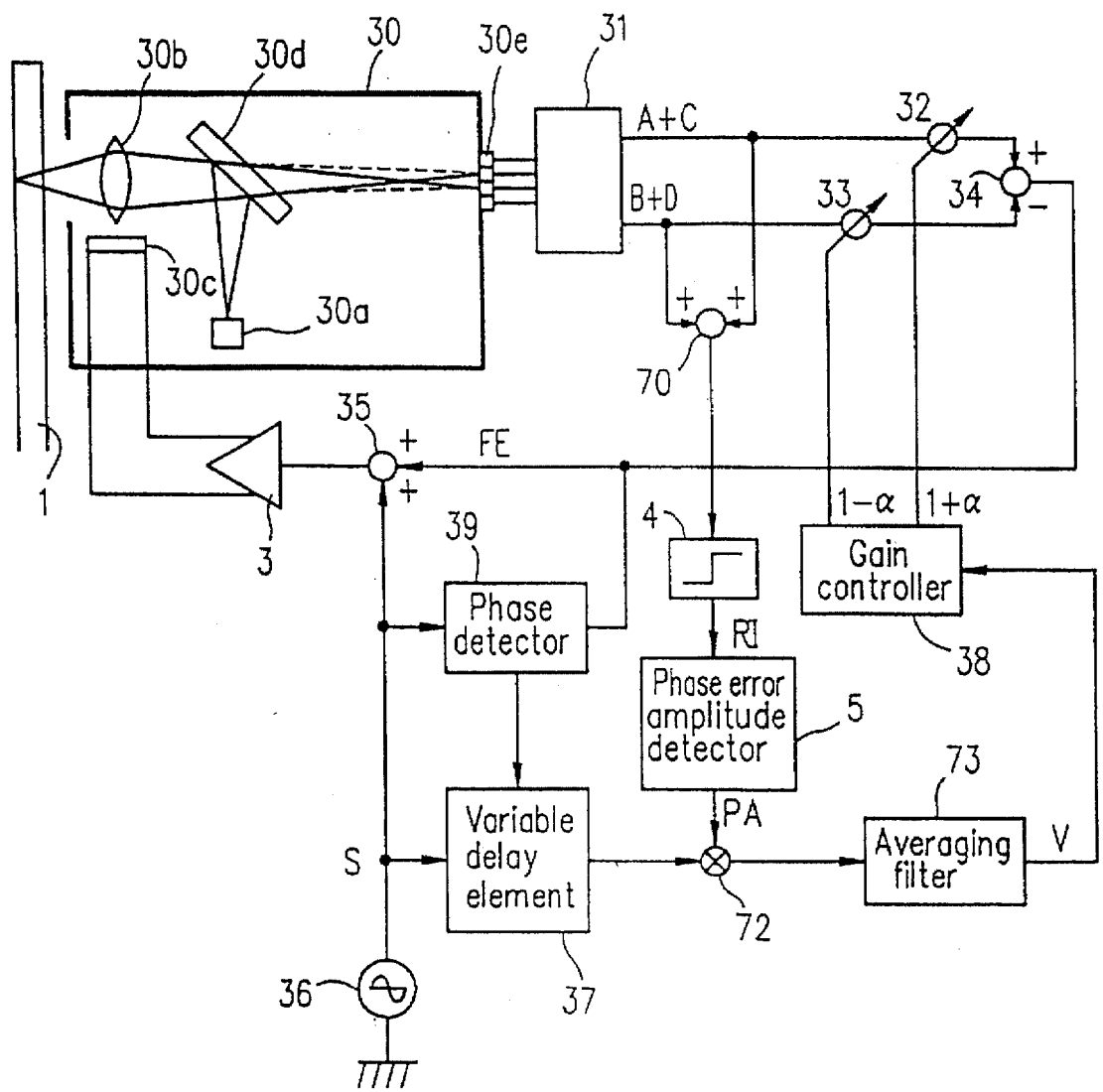
FIG. 10 is a block diagram of an optical disk drive apparatus according to a fourth example of the invention.
Figure 11:
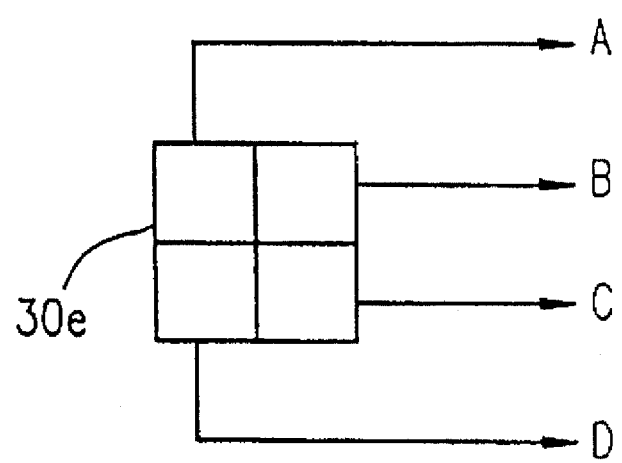
FIG. 11 is a block diagram of an alternative optical disk drive apparatus according to the fourth example of the invention.

Hereinafter, a fourth example according to the present invention will be described. FIG. 10 is a block diagram of an optical disk driving apparatus according to a fourth example of the invention. An optical pickup 30 includes: a laser diode 30a; an objective lens 30b; a focus actuator 30c; a plane-table half mirror 30d; and a divided photo detector 30e orthogonally divided into the four portions as shown in FIG. 10. A head amplifier 31 generates diagonal sum signals, i.e., (A+C) and (B+D), of respective divided portions (A, B, C and D) of the divided photo detector 30e. Variable gain amplifiers 32 and 33 amplify the diagonal sum signals with the respective gains (1+α) and (1−α). The amplified signals are fed back through the differential amplifier 34, the focus servo circuit 3, and the summing amplifier 35 to the focus actuator 30c, thereby performing a focus control. The digitizing circuit 4 and the phase error amplitude detector 5 function in a similar manner to those described in the first example.

A sinusoidal signal 8 (=sinωt) generated by a sinusoidal signal generator 3,5 is applied to the signal to the focus servo loop. Then, in response to the sinusoidal signal S, the focus actuator 30c vibrates. This displacement Δx is expressed by the following equation.

$$\Delta x = a\sin(\omega t - \psi) \tag{1}$$

where $a$ is a constant and $\psi$ is a response delay of the focus servo. If the focus actuator 30b vibrates, then the jitter detection signal PA is also varied. If the relation between the jitter detection signal PA and the focus error x (x becomes minimum at zero) may be approximated by the following equation (where b and c are constants), $$PA = bx^2 + c \tag{2}$$

Then, if substituting Equation (1) for Equation (2), PA may be expressed as follows.

$$PA = b(x_0 + \Delta x)^2 + c = b\{x_0 + a\sin(\psi t - \psi)\}^2 + c \tag{3}$$

where $x_0$ is a focus offset factor caused by the adjustment error of the optical pickup or the like, i.e., the factor desired to be removed by the method of the invention.

The same amount of delay $\psi$ as that of the tracking delay of the servo loop is applied to the sinusoidal signal S by the variable delay element 37, and then the sinusoidal signal S is multiplied by the (phase error amplitude) signal PA.

$$PA \times a\sin(\omega t - \psi) = (abx_0^2 + c)\sin\theta + 2a^2bx_0\sin^2\theta + \tag{4}$$

$$a^3b\sin^3\theta : \theta = \omega t - \psi$$

The product value signal is integrated by the averaging filter 73 for every interval of $0 \leq \theta < 2\pi$. Since sinθ and sin²θ are odd functions, the respective integrated values thereof are zero. Accordingly, by calculating the second term only;

$$V = \int_0^{2\pi} (PA \times a\sin\theta) d\theta \tag{5}$$

$$= 2a^2bx_0 \int_0^{2\pi} \sin^2\theta d\theta$$

$$= 2\pi a^2 bx_0$$

Therefore, a signal V linearly proportional to the focus offset $x_0$ may be obtained. The focus offset $x_0$ becomes zero when the focus offset does not exist. Naturally, the phase error amplitude function (2) becomes minimum at this time.

If the multiplication average signal V is fed back to the focus servo loop without performing any more processing, then the signal V is controlled so as to be zero. However, in this example, this multiplication average signal V is not used for a DC current, but for correcting the gain balance. As mentioned before, the focus offset is caused mainly by the deviation of the optical axis of the light incident on the photo detector, i.e., the balance of the received light. Hereinafter, an astigmatism method used in this example will be described. A light beam reflected by the optical disk 1 is passed through a plane-table half mirror 30d, thereby generating an astigmatic aberration. That is to say, two focal points are formed at the two points separated from each other in the direction of the optical axis. The shapes of the images formed at the respective focal points become elliptical crossing each other at a right angle. Then, the divided photo detector 30e orthogonally divided into the four portions is placed at an approximately central point between the two focal points. The photo detecting portions A and C are adjusted so as to be disposed An the longitudinal direction of one of the two images; the photo detecting portions B and D are adjusted to be disposed in the longitudinal direction of the other image; and the intersection between the two division lines is adjusted to be completely corresponds to the optical axis. Then, the focus error signal may be expressed by the following Equation (6) using the respective outputs A, B, C and D from the respective portions.

$$FE = (A + C) - (B + D) \tag{6}$$

In this case, FE=0 when the focusing position is in an optimized state.

However, in actuality even when the focusing position is in an optimized state, because of the deviation of the optical axis, $$A + C \neq B + D$$

and therefore, FE does not become zero. Thus, if a focus control so that FE becomes zero is performed, then an offset is generated. Accordingly, the balance between the gains is adjusted so that the following relation is satisfied among both diagonal sum signals.

$$(1+\alpha)(A+C) = (1-\alpha)(B+D) \tag{7}$$

Then, the focus error signal is calculated by the following equation.

$$FE = (1+\alpha)(A+C) - (1-\alpha)(B+D) \tag{8}$$

Then, the optical axis is adjusted equivalently. This coefficient α may be determined from the multiplication average signal V by the gain controller 38 in the following manner.

$$\alpha = \int V dt \tag{9}$$

That is to say, the variable gain amplifiers 32 and 33, the focus actuator 30c, the photo detector 30e, the phase error amplitude detector 5, the multiplier 72, the gain controller 38 and the variable gain amplifiers 32 and 33 constitute a closed loop. The coefficient α is determined when this closed loop reaches a balanced state. Herein, assuming that the coefficient α is zero and that a focus offset exists, the multiplication signal V≠0 is generated and temporally integrated, so that the coefficient α expressed by Equation (9) is determined. If the focus offset is reduced by the coefficient α, the multiplication average signal V is also reduced. When V becomes zero by repeating the above-described operations, the coefficient α becomes constant, so that a gain balance is determined.

In this example, by adjusting the gain balance so as to remove the offset, the following advantages may be obtained. Specifically, in the case where the light beam does not reach the photo detector because of the scratch on the surface of the disk, the servo loop does not go out of the controllable range. By simply applying a correction offset, the offset functions as a DC displacement when the light is absent. As a result, the focus actuator is accelerated toward only one direction. However, according to this method, FE=0 when the light is absent. Therefore, such a malfunction does not occur.

In this example, the sinusoidal signal S to be multiplied by the jitter detection signal PA is delayed by the variable delay element 37 because of the following reasons. If the frequency of the sinusoidal signal S is sufficiently higher than the band frequency (up to 2 kHz) of the focus servo loop, then, in Equation (1), $$\psi = 180°$$

Accordingly, a signal having the same phase as that of the focus variation may be obtained simply by inverting the polarity without delaying it.

However, in the case of using the phase error amplitude detector 5 shown in FIG. 3 as described in this example, a sinusoidal wave having a high frequency cannot be employed as described above. The reason is as follows. It is necessary to perform the averaging operation sufficiently in order to detect the phase error amplitude at a sufficient S/N. Therefore, even if a focus displacement is applied at a high frequency, the accompanying variation of the detection signal disappears during this averaging operation, so that the focus correction signal V can not be obtained by performing the above-described Equations (1) to (5). Consequently, in this example, a sinusoidal signal S having a sufficiently low frequency (in the approximate range of 10 to 100 Hz) within the servo band is required to be used.

In this case, the delay ψ of the focus actuator is in the range of 0 to 180 degrees. Accordingly, the variable delay element 37 is required to be used. This phase lag difference ψ may be obtained by detecting the phase difference between the sinusoidal signal S and the focus error signal FE by the phase detector 39.

As described above, in this example, by applying a periodic variation that is equal to, or less than the focus servo band frequency to the focus servo loop, the level of the phase error amplitude may be minimum.

In this example, the sinusoidal signal S and the jitter detection signal PA are multiplied by using a multiplier 72. Alternatively, the product may be obtained by an approximate method without using the multiplier. For example, by sampling and holding the Jitter detection signal PA at the peak point of the sinusoidal signal S, a product approximately equal to that of the multiplication may be obtained.

In the foregoing Examples 1 to 4, a method for searching for a focusing position so that a jitter detection signal obtained from the phase error amplitude of the read out information signal becomes the minimum has been described. However, such a method is not limited to the search of the focus. If the jitter detection signal is fed back to the tracking control system, the optimum tracking position may be searched for by this method. In addition, such a method is applicable to the correction of a skew error between an optical disk carrier and an objective lens. In order to detect the amplitude of the phase error, i.e., an absolute value, a method for calculating the OR of the output signals UP and DN of the phase detector is described in the foregoing examples. However, this is not the only method. For example, a method in which the differential signal UP-DN of the phase detector is full-wave rectified with respect to the zero level may also be used.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A jitter detecting apparatus comprising:

a digitizing means for generating a digital pulse signal from an information signal based on an appropriate threshold value; and a phase error amplitude detection means for outputting a signal varying in accordance with an absolute value of a phase error between a leading edge or a trailing edge of the digital pulse signal and a reference signal generated being synchronized with the digital pulse signal, wherein the phase error amplitude detection means comprises:

a phase detection means for detecting the phase error between the leading edge or the trailing edge of the digital pulse signal and the reference signal;

a phase lock means for feedback controlling a frequency or a phase of the reference signal so that an average value of the phase error becomes zero; and a means for calculating the absolute value of the phase error.

2. A jitter detecting apparatus according to claim 1, wherein, when the leading edge or the trailing edge of the digital pulse signal has a phase lead with respect to a synchronized clock signal generated being synchronized with the digital pulse signal, the phase detection means generates a first signal having a pulse width corresponding to an amount of the phase lead; and when the leading edge or the trailing edge of the digital pulse signal has a phase lag with respect to the synchronized clock signal generated being synchronized with the digital pulse signal, the phase detection means generates a second signal having a Pulse width corresponding to an amount of the phase lag; and the phase detection means outputs a differential signal representing a difference between the first signal and the second signal as a phase error signal; and the phase error amplitude detection means comprises a means for obtaining the absolute value of the phase error by adding the first and the second signals.

3. A jitter detecting apparatus according to claim 2, wherein the phase detection means comprises means for transferring an offset pulse signal having a predetermined width to a first output and a second output when the leading edge or the trailing edge of the digital pulse signal is synchronous with the synchronized clock signal; transferring a pulse signal having a width obtained by adding a width corresponding to an arbitrary time period to the width of the offset pulse signal to the first output when the leading edge or the trailing edge of the digital pulse signal is advanced with respect to the synchronized clock signal by the arbitrary time period; and transferring a pulse signal having a width obtained by adding a width corresponding to an arbitrary time period to the width of the offset pulse signal to the second output when the leading edge or the trailing edge of the digital pulse signal is delayed with respect to the synchronized clock signal by the arbitrary time period;

the phase lock means comprises means for controlling a frequency and a phase of the synchronized clock signal so that a value obtained by averaging the difference between the pulse signal at the first output and the pulse signal at the second output becomes zero;

the jitter detecting apparatus comprising:

a time voltage conversion means for obtaining an OR signal of the pulse signals at the first and the second outputs as the absolute value of the phase error, thereby converting the pulse width of the OR signal into a voltage value;

a means for generating a dummy pulse signal having the same width as that of the offset pulse signal in accordance with the edge of the digital pulse signal; and a compensation means for removing factors by the dummy pulse signal from the OR signal of the pulse signals at the first and the second outputs or from a signal obtained by voltage converting the OR signal.

4. A jitter detecting apparatus according to claim 3, wherein the phase detection means comprises:

a first flip-flop in which an output state is varied in the leading edge and the trailing edge of the digital pulse signal;

a second flip-flop in which an output state is varied in the leading edge of the synchronized clock signal; and a first gate element for resetting the first flip-flop and the second flip-flop when the outputs of the first flip-flop and the second flip-flop vary;

and wherein the compensation means comprises:

a third flip-flop in which an output state is varied in the leading edge and the trailing edge of the digital pulse signal; and a second gate element for resetting the third flip-flop by varying the output state of the third flip-flop, and wherein the output of the first flip-flop is regarded as a first output; the output of the second flip-flop is regarded as a second output; and the output of the third flip-flop is regarded as a dummy pulse output.

5. A jitter detecting apparatus according to claim 3, wherein the time-voltage conversion means comprises: a capacitor for accumulating electrons while the sum signal of the pulse signals at the first and the second outputs is being output; a means for sampling and holding a voltage to be applied to terminals of the capacitor after an appropriate time period has passed from the leading of the information signal; and a means for discharging the electrons accumulated in the capacitor after an appropriate time period has passed from a sampling and holding time.

6. An optical disk driving apparatus comprising: an optical disk carrier provided on a spindle motor; an optical pickup means comprising a laser emission means, an objective lens, a photo detection means, and a focus actuator; and a focus servo means for controlling the focus actuator so that a focus error signal obtained by optically detecting a distance between a focal point of a laser beam concentrated by the objective lens and the optical disk carrier is kept in a vicinity of a command reference, wherein the optical disk driving apparatus further comprises a jitter detecting apparatus according to claim 1; and a focus error compensation means for displacing the focus actuator so as to minimize an output signal from the jitter detecting apparatus, thereby supplying a compensation signal with respect to the command reference to the focus control means.

7. An optical disk driving apparatus according to claim 6, wherein a focus control is performed when a residual error exists with respect to a surface deviation of the optical disk carrier, and a focus error signal when an output signal from the litter detecting apparatus becomes minimum is held so as to be regarded as a compensation signal.

8. An optical disk driving apparatus according to claim 6 comprising: a periodic signal generating means for generating a periodic signal synchronized with one revolution of the spindle motor, thereby displacing the focus actuator through the focus control means; an amplitude detecting means for detecting a varying amplitude of the focus error signal; and a variable amplifying means for arbitrarily varying the amplitude of the periodic signal so that the varying amplitude is within a predetermined range.

9. An optical disk driving apparatus according to claim 7, comprising: an amplitude detection means for detecting a varying amplitude X, where X is a varying amplitude of the focus error signal; and a differential calculation means for calculating $X_{max}-X$ with respect to the varying amplitude X, where $X_{max}$ is a predetermined value, wherein an amplifying rate of the variable amplifying means is determined by the output of the differential calculation means.

10. An optical disk driving apparatus according to claim 6 comprising: a tracking actuator and a tracking control means so that the focal point of the laser beam scans a spiral information track provided on the optical disk carrier, a buffer memory for temporarily writing a readout information signal read out from the information track by using the laser begun and for reading out the information at a rate slower than the read-out information signal;

a memory control means for executing and interrupting the write into the buffer memory;

a means for supplying a signal for making the laser beams can repeatedly identical track turn during the write protect period to the tracking control means; and a means for generating a signal to the focus control means so as to displace a distance between the focal point and the optical disk carrier during the write protect period.

11. An optical disk driving apparatus according to claim 10 comprising a clock signal extracting means for separating and extracting an information clock signal from the read-out information signal, wherein the write into the temporary memory means is performed in synchronization with the information clock signal.

12. An optical disk driving apparatus according to claim 6 comprising: a signal generation means for vibrating not only the focus control means but also the focus actuator by generating a sinusoidal signal; and a compensation means for multiplying the output signal from the jitter detecting apparatus by the sinusoidal signal, thereby supplying a compensation signal to the focus control means so that an average value of the product of the multiplication is zero.

13. An optical disk driving apparatus according to claim 12 comprising:

- a focus error detection means for optically detecting a positional error between the focal point of the laser beam and the optical disk carrier, thereby transferring the error as a differential signal representing a difference between a first detection signal and a second detection signal;
- a first variable gain amplifier for amplifying the first detection signal with a first gain,
- a second variable gain amplifier for amplifying the second detection signal with a second gain, and
- a gain control means for reciprocally determining the first and the second gains based on a multiplication average value of the output signal from the jitter detecting apparatus and the sinusoidal signal,
- wherein a differential signal representing a difference between an output from the first variable gain amplifier and an output from the second variable gain amplifier is fed back to the focus actuator as the focus error signal through the focus control means.

14. An optical disk driving apparatus according to claim 12 wherein a frequency of the sinusoidal signal is set to be equal to a band frequency of the focus control or less, and the sinusoidal signal is supplied to the multiplication means through a delay means for delaying a phase by a predetermined amount.

15. An optical disk driving apparatus according to claim 12 wherein an optical element for forming two focal points in a direction of the optical axis is provided between the objective lens and the photo detection means, and the photo detection means is located at substantially a central position between the two focal points, and wherein the photo detection means is composed of plural pairs of photo detection portions; an output obtained by synthesizing outputs from a first pair of photo detection portions is regarded as a first detection signal; and an output obtained by synthesizing outputs from a remaining second pair of photo detection portions is regarded as a second detection signal.

16. An optical disk driving apparatus according to claim 12 wherein the first gain is expressed by $(1+\alpha)$; the second gain is expressed by $(1-\alpha)$; and the $\alpha$ is obtained from a signal calculated by temporarily integrating the multiplication average value of the output signal from the jitter detecting apparatus and the sinusoidal signal.

* * * * *

UNITED STATES PATENT AND TRADEMARK OFFICE
CERTIFICATE OF CORRECTION

PATENT NO.    : 5,663,942

DATED         : September 2, 1997

INVENTOR(S)   : Hiromichi Ishibashi et al.

It is certified that error appears in the above-identified patent and that said Letters Patent is hereby corrected as shown below:

Claim 2, line 12, change "Pulse" to --pulse--.

Claim 10, lines 12-13, change "beams can" to --beam scan--.

Signed and Sealed this

Thirteenth Day of January, 1998

Attest:

Attesting Officer

BRUCE LEHMAN

Commissioner of Patents and Trademarks